United States Patent [19]

Hoch

[11] 4,281,732

[45] Aug. 4, 1981

[54] TWO-STAGE DEADMAN CONTROL FOR WALK-BEHIND MOWER

[75] Inventor: John J. Hoch, Beaver Dam, Wis.

[73] Assignee: Deere & Company, Moline, Ill.

[21] Appl. No.: 5,133

[22] Filed: Jan. 22, 1979

[51] Int. Cl.³ .............................................. B62D 15/04
[52] U.S. Cl. .................................. 180/19 H; 56/11.8
[58] Field of Search ................... 192/99 S; 180/19 H, 180/273; 56/10.8, 11.8, 11.3

[56] References Cited

U.S. PATENT DOCUMENTS

| | | | |
|---|---|---|---|
| 2,110,265 | 3/1938 | Gillett | 192/99 S |
| 3,800,616 | 4/1974 | Hoffmeyer et al. | 56/11.3 X |
| 3,942,604 | 3/1976 | Black | 180/19 H X |
| 4,048,788 | 9/1977 | Kamlukin et al. | 56/11.8 X |
| 4,132,280 | 1/1979 | Jones et al. | 180/19 H |
| 4,167,221 | 9/1979 | Edmonson et al. | 180/19 H |

*Primary Examiner*—Philip C. Kannan

[57] ABSTRACT

A lawn mower is provided with a control mechanism for a propel drive clutch. The control mechanism includes a deadman control lever which operates to hold a clutch-control lever in a clutch-engage position only when the deadman control lever is held in a lever-holding position. Upon release of the deadman control lever, the latter automatically moves to a lever-release position which permits the clutch-control lever to automatically move to a clutch-disengage position.

4 Claims, 5 Drawing Figures

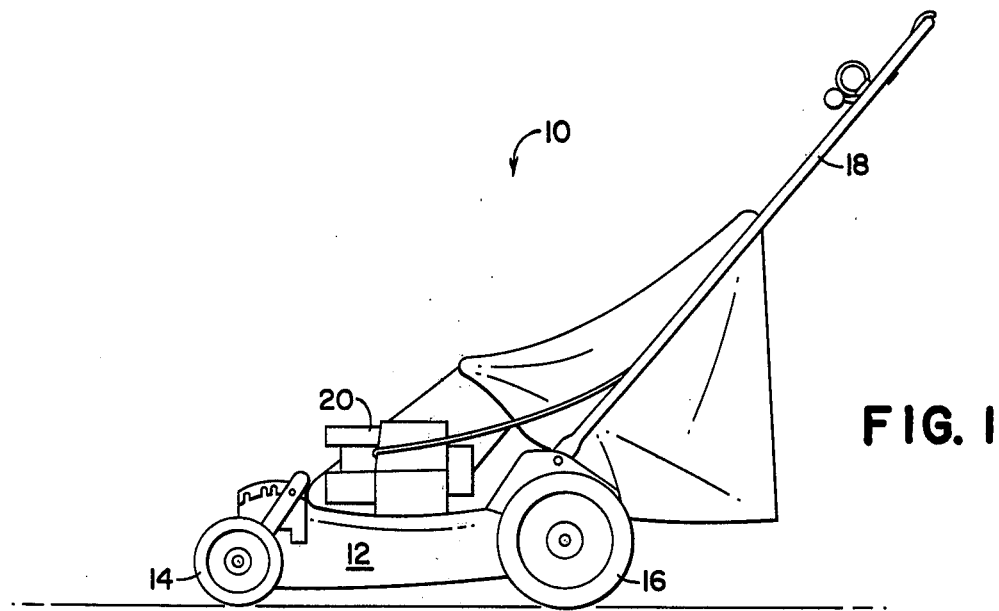
FIG. 1
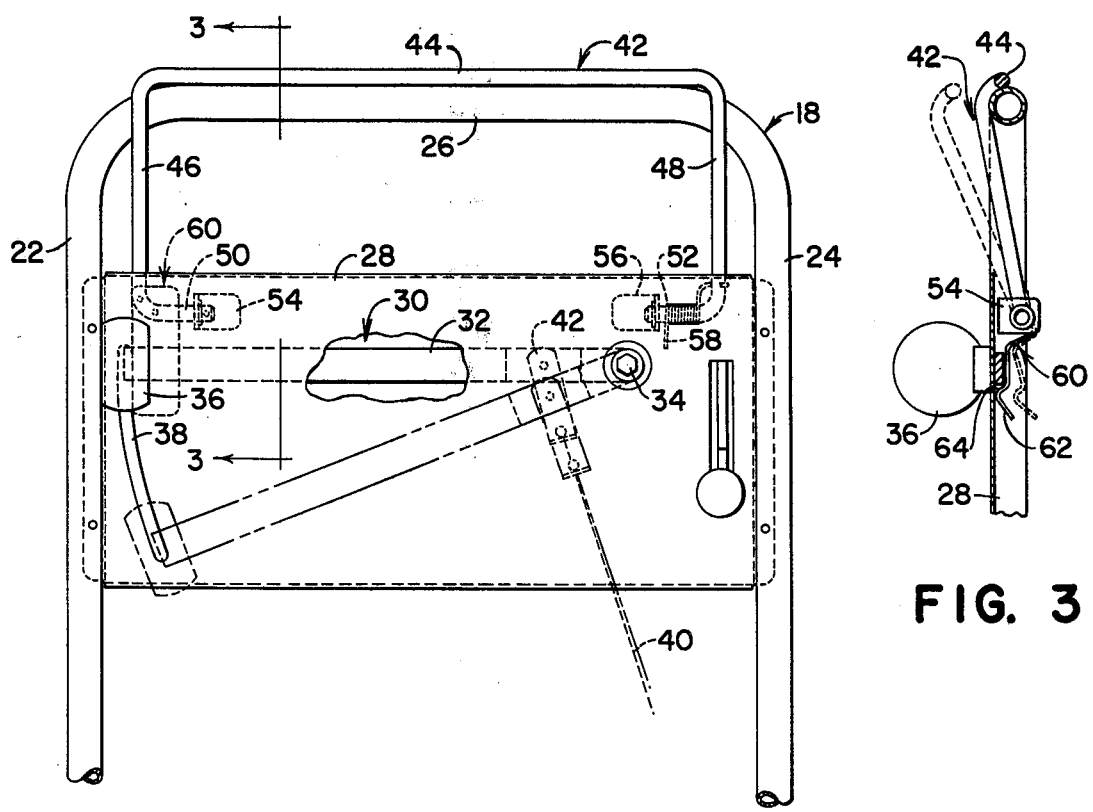
FIG. 2
FIG. 3

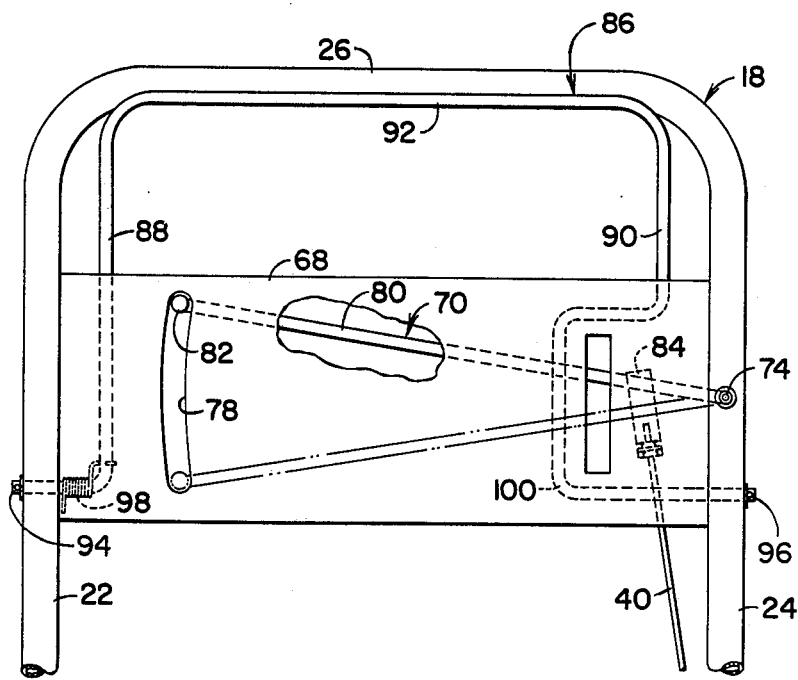
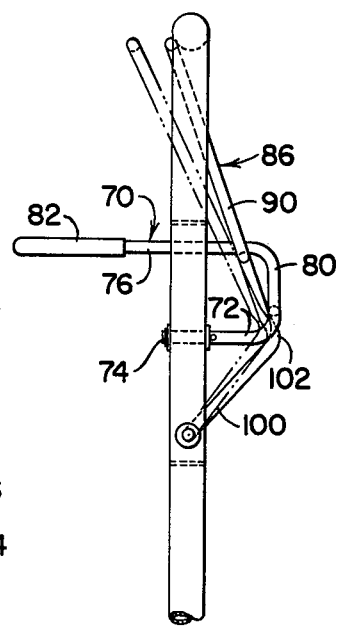
FIG. 4
FIG. 5

TWO-STAGE DEADMAN CONTROL FOR WALK-BEHIND MOWER

BACKGROUND OF THE INVENTION

The present invention relates to a control mechanism for a walk-behind mower and more particularly relates to a deadman control for such mowers.

It is known to provide walk-behind powered implements, such as mowers or snowblowers, and the like, with deadman controls which sense the presence of an operator at the guide handles of the implements and disable the traction or propel drive and/or implement tool drives whenever an operator leaves a normal working position wherein he concurrently grasps the guide handle and a deadman control handle.

Deadman controls of the aforementioned type have the disadvantages that they may be inadvertently operated to effect drive engagement or may be operated by children.

SUMMARY OF THE INVENTION

According to the present invention, there is provided a novel deadman control for the traction drive of a walk-behind powered implement.

A broad object of the invention is to provide a deadman control mechanism constructed to minimize accidental and/or unauthorized operation of the powered implement with which it is associated.

A more specific object is to provide a deadman control mechanism including a deadman control lever and a clutch control lever constructed such that the former operates to retain the latter in a clutch-engage position.

These and other objects will become apparent from a reading of the following description in conjunction with the appended drawings.

BRIEF DESCRIPTION OF THE DRAWINGS

FIG. 1 is a left side elevational view of a walk-behind, self-propelled lawn mower which is representative of the implements with which the present invention is adapted for use.

FIG. 2 is an orthogonal top view showing one form of the deadman control mechanism mounted on the guide handle of the mower of FIG. 1.

FIG. 3 is a vertical sectional view of the control mechanism taken along the line 3—3 of FIG. 2.

FIG. 4 is an orthogonal top view of a second form of the deadman control mechanism mounted on the guide handle of the mower of FIG. 1.

FIG. 5 is a left side view of the control mechanism shown in FIG. 4.

DESCRIPTION OF THE PREFERRED EMBODIMENT

Referring now to FIG. 1, there is shown a self-propelled, walk-behind mower 10 including a main frame 12 supported by front and rear sets of ground wheels 14 and 16. Secured to the frame 12 is an upwardly and rearwardly projecting guide handle 18. An engine 20 is mounted centrally on the frame 12 and a propel drive train (not shown) couples an output shaft of the engine to the rear set of wheels 16. The propel drive train may be of any conventional type including a clutching element which is normally spring-biased to a disengaged position and which must be moved against this biasing force to an engaged position.

Referring now to FIGS. 2 and 3, it can be seen that the handle 18 includes parallel right and left legs 22 and 24 joined at their upper ends by a transverse grip portion 26. Extending between and joined to the handle legs 22 and 24 is a rectangular sheet metal plate 28.

Mounted on the handle 18 is a two-stage deadman control mechanism comprising a clutch control lever 30. The lever 30 includes an elongate bar 32 located beneath the plate 28 and having a left end pivotally connected to the plate by an upright pivot pin 34 and having a right end to which a knob 36 is secured, the latter being received in an arcuate slot 38 formed radially about the pivot pin 34. The lever 30 is attached to a clutch control cable 40 by a connector 42 and is movable between a forward clutch-disengage position, as shown in broken lines, and a clutch-engage position, as shown in full lines.

A deadman control lever 42 is provided for selectively retaining the clutch control lever 30 in its clutch-engage position. Specifically, the lever 42 comprises a rod bent to form a central transverse grip portion 44 extending orthogonally to and joined at its ends to right and left fore-and-aft extending legs 46 and 48 respectively having in-turned ends 50 and 52 disposed in axial alignment with each other and rotatably mounted in first legs of angle brackets 54 and 56 having their respective second legs fixed to the underside of the plate 28 at locations spaced inwardly from right and left ends thereof. Thus, the lever 42 is mounted for vertical pivotal movement about a transverse axis between a lever-release position wherein the grip portion 44 is elevated above the grip portion 26 of the handle 18 as shown in broken lines in FIG. 3 and a lever-holding position, wherein the grip portion 44 is against the handle grip portion 26 as shown in solid lines. A torsion spring 58 is received on the in-turned end 52 of the lever 42 and acts to bias the lever toward its lever-release position. Fixed so as to be cantilevered from the lever 42 adjacent to the in-turned end 50 of the lever 42 is a detent 60 in the form of a spring metal strap having its rear end portion riveted to the lever 42 and having a free forward end portion defining a ramp 62 leading to a detent surface 64. The ramp 62 is located in a position below the path of movement of the bar 32 of the control lever 30 when the deadman control lever 42 is in its lever-release position and is located in the path of movement of the bar 32 when the lever 42 is in its lever-locking position. Assuming that the lever 42 is moved to its lever-locking position while the lever 30 is in its clutch-disengage position, the lever 30 may be moved to its clutch-engage position by swinging the bar 32 into engagement with the ramp 62 of the detent 60 to thus cause the latter to be deflected downward permitting the bar 32 to swing past the detent surface 64 which springs back to a position forward of the bar 32 once the lever 30 reaches its clutch-engage position. In this way the detent 60 prevents the lever 30 from returning to its clutch-disengage position as long as the deadman control lever 42 is depressed against the handle 18.

Referring now to FIGS. 4 and 5, therein is shown a second form of the deadman control mechanism. Specifically, the handle 18 includes a rectangular plate 68 extending between and fixed to the handle legs 22 and 24. A clutch-control lever 70 is in the form of a rod having a first upright leg 72, pivotally mounted, as at 74, in the handle leg 24, and having a second upright leg 76 projecting upwardly through an arcuate opening 78 located in the plate 68 at a fixed radius about the pivot 74. Connecting the legs 72 and 76 is a transverse portion 80 which is located beneath the plate 68. A hand grip 82 is received on the leg 76 and may be grasped by an operator's hand for moving the lever 70 from a forward clutch-disengage position, as shown in broken lines, to a rearward clutch-engage position as shown in solid lines. Rearward movement of the lever 70 is transmitted to effect clutch engagement by means of the cable 40 which is secured to the lever portion 80 at 84.

For the purpose of selectively latching the lever 70 in its clutch-engage position, there is provided a deadman control lever 86 comprising a rod bent to include right and left fore-and-aft extending legs 88 and 90 joined by a transverse grip portion 92 and having respective out-turned, axially aligned ends 94 and 96 pivotally mounted in the handle legs 22 and 24. Thus the lever 86 is mounted for vertical pivotal movement about a transverse axis between a lever-release position wherein the grip portion 92 is elevated above the handle grip portion 26, as shown in broken lines in FIG. 5, and a lever-locking position wherein the grip portion 92 is engaged with the grip portion 26, as shown in solid lines in FIG. 5. Mounted on the out-turned end of the lever 86 is a torsion-spring 98 which acts to bias the lever 92 to its lever-release position.

The left leg 90 of the lever 92 is specially configured and positioned relative to the transverse portion 80 of the clutch control lever 70 so as to engage the portion 80 and prevent the lever from returning from its clutch-engage position when the deadman control lever 86 is in its lever-holding position. Specifically, the leg 90 includes a transversely offset portion 100 which passes over the portion 80 of the lever 70 and includes a detent surface 102 which projects to a level below that occupied by the portion 80 when the control lever 86 is in its lever-holding position. Thus, when the clutch-control lever 80 is moved to its clutch-engage position, it may be retained therein by moving the deadman control lever 86 to its lever-holding position, the detent surface 102 then engaging the portion 80 of the lever 70.

The operation of the forms of the invention illustrated in FIGS. 2-3 and 4-5 is thought to be clear from the foregoing and for the sake of brevity no further description is given. However, it is to be noted that the deadman control levers 42 and 86 of the two forms of the invention could be used to control other functions such as clutches for engaging drives to mower blades and the like. When used with mowers having such drives, the deadman control levers could be operated independently of the traction drive clutch-control levers in situations where engagement of the traction drive would not be desirable.

I claim:

1. In combination with a self-propelled, walk-behind implement having a main frame and an upwardly and rearwardly extending guide handle fixed to the frame, a two-stage control mechanism adapted for operating a normally spring-disengaged traction drive clutch, comprising: a clutch control lever, in the form of a flat bar, adapted for connection to the clutch and pivotally mounted on the handle for movement along a predetermined path between clutch-release and clutch-engage positions; a deadman control lever including a cantilevered spring metal strap bent to form a detent having a ramp at its free end, the deadman control lever being pivotally mounted on the handle for movement between a lever-release position, wherein the spring metal strap is clear of said path, and a lever-holding position wherein the ramp of the spring metal strap is disposed in the path and blocks movement of the clutch control lever from its clutch-engage position, whereby the clutch control lever may be moved to its clutch-engage position after the deadman control lever is moved to its lever-holding position by engaging the ramp and deflecting the spring metal strap; and biasing means connected between the handle and the deadman control lever and urging the latter towards its lever-release position.

2. The combination defined in claim 1 wherein the handle includes a pair of parallel legs joined by a transverse grip portion; said deadman control lever including a rod defining a transverse grip portion having its opposite ends joined to respective legs, which parallel the legs of the handle and are joined to respective transversely extending end portions and being vertically pivotally connected to the handle for swinging about a transverse axis; said grip portion of the deadman control lever respectively being located above and in engagement with the grip portion of the handle when the deadman lever is in its lever-release and lever-hold positions; said clutch-control lever being mounted for pivoting about a second axis extending orthogonally to the transverse axis; and said sheet metal strap being cantilevered on said deadman control lever in the area where one of the legs of the deadman control lever joins the transversely extending end portion.

3. The combination defined in claim 2 wherein the handle includes a plate extending between and secured to the parallel legs; said clutch control lever comprising a bar extending parallel to and beneath the plate and having one end pivotally connected thereto for movement about said second axis and having a second end connected to an upright knob received in an arcuate slot formed in the plate at a fixed radius about the second axis; and said metal strap being located to engage the bar at a location adjacent the knob.

4. In combination with a self-propelled, walk-behind implement having a main frame and an upwardly and a rearwardly extending guide handle fixed to the frame and including an upwardly and rearwardly facing plate, a two-stage control mechanism adapted for operating a normally spring-disengaged traction drive clutch, comprising: a deadman control lever formed by a rod having axially aligned transverse ends pivotally received in the handle and respectively joined to a transverse grip portion by opposite legs extending orthogonally to the ends, the deadman control lever thus being mounted on the handle for pivotal movement between lever-release and lever-hold positions; one of said last-mentioned legs having a transverse offset therein; a clutch control lever adapted for connection to the clutch and pivotally mounted on the handle for movement along a predetermined path between clutch-release and clutch-engage positions; said clutch control lever having a portion underlying a portion of the transverse offset of the dedman control lever; said transverse offset including a vertical projection defining a detent surface and extending below the level of the portion of the clutch control lever extending beneath the offset portion only when the deadman control lever is in its lever-hold position.

* * * * *